United States Patent Office 3,350,145
Patented Oct. 31, 1967

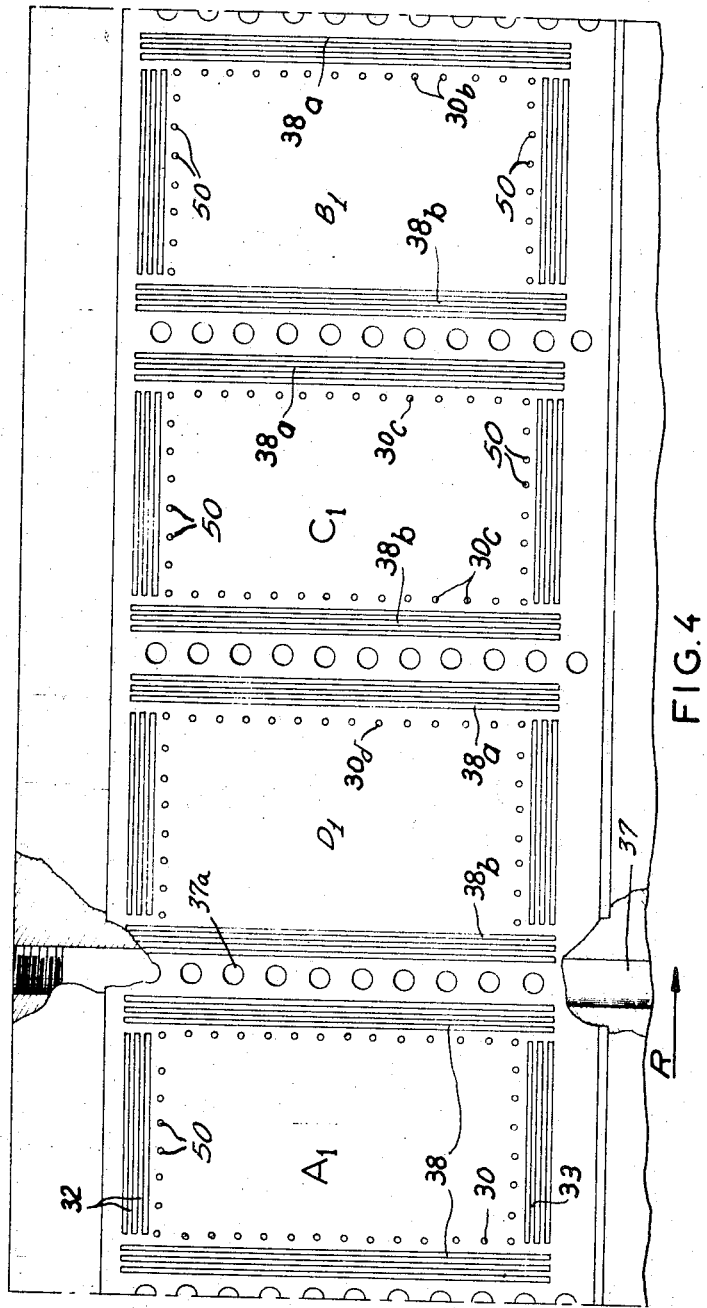

3,350,145
FLUID-BEARING
Marcel Pierre Le Nabour, Maisons Laffitte, France, assignor to Commissariat à l'Energie Atomique, Paris, France
Filed Sept. 28, 1965, Ser. No. 490,808
Claims priority, application France, Oct. 6, 1964, 990,417
11 Claims. (Cl. 308—122)

ABSTRACT OF THE DISCLOSURE

A bearing has fluid cushions uniformly spaced about the axis of the supported shaft. Rotation of the fluid with the shaft and precession of the rotating shaft is eliminated by injecting fluid for the cushions in a direction opposite to the rotation of the shaft.

---

The present invention relates to improvements in fluid bearings for shafts of rotating machines.

It is known that fluid bearings, especially of the hydrostatic type, are usually provided with a cylindrical housing in which the shaft to be mounted is capable of rotating with play while being supported on fluid cushions which normally prevent any contact between solids.

In known bearings of this type, the fluid cushions are uniformly spaced around the axis of the housing and are supplied with fluid by means of injectors which are disposed symmetrically with respect to the central diametral plane of the fluid cushion, thereby ensuring that the resultant of the forces exerted on the shaft is normally zero by reason of symmetry. The shaft accordingly rotates about its geometrical axis which coincides with the bearing axis, or in other words with the neutral axis of rotation.

A force which is applied transversely to the shaft moves the axis of the shaft away from the bearing axis and consequently produces a variation in the thickness of the fluid cushions. These variations in thickness produce variations in pressure which tend, not to bring back the shaft to its initial position, but to impart thereto a complex movement which is known as "precession" and in which the shaft rotates about its own axis whilst this latter in turn rotates about the neutral axis of rotation, that is to say, about the bearing axis.

The precession referred-to has the same frequency as the natural frequency of the shaft associated with its bearings and the direction of precession is that of the initial movement of rotation. The precession is damped in the range of low frequencies of the initial movement of rotation and is sustained at the higher frequencies; the transition from the damped regime to the sustained regime takes place at a critical frequency whose value can only be determined by experiment. This value usually varies between twice and three times the precession frequency, that is to say the natural frequency of the shaft associated with its bearings.

Operation at frequencies which are at least equal to the critical frequency is accompanied by breakdown of the fluid layers of the bearing, which is always detrimental both to the bearing and to the shaft.

The present invention has for its object to reduce in a very large measure or even to eliminate the process of precession of the rotating shaft, in particular by creating about said shaft conditions which are intended to limit or practically eliminate the process of entrainment, in particular as a result of viscosity, of the fluid which forms the cushions of the rotating shaft.

To this end, the invention is directed to the construction of a type of bearing which is both simple and sturdy, characterized by a particular arrangement of the injectors which tend to cause the fluid to circulate in the direction opposite to the movement of rotation of the shaft.

This bearing is mainly characterized in that it comprises a housing having a generally cylindrical shape in which a shaft substantially coaxial with said housing is adapted to rotate with play, injectors opening into said housing for supplying fluid cushions under pressure around the entire periphery of said shaft, said fluid injectors being so adapted that the fluid delivered by these latter to said cushions has a tendency to circulate between the housing and the shaft in the direction opposite to the movement of rotation of said shaft in order to reduce the entrainment of said fluid by the shaft particularly as a result of viscosity and in order to reduce the effects of the movement of precession of said shaft.

The description which now follows in reference to the accompanying drawings and which is given by way of example without implied limitation will clearly explain the manner in which the invention can be carried into effect, the characteristic features which are brought out by said description and by the drawings being understood to form a part of said invention.

In the accompanying drawings:

FIG. 4 is a developed view of the internal surface of the body of the bearing of FIG. 1.

Figure 1:
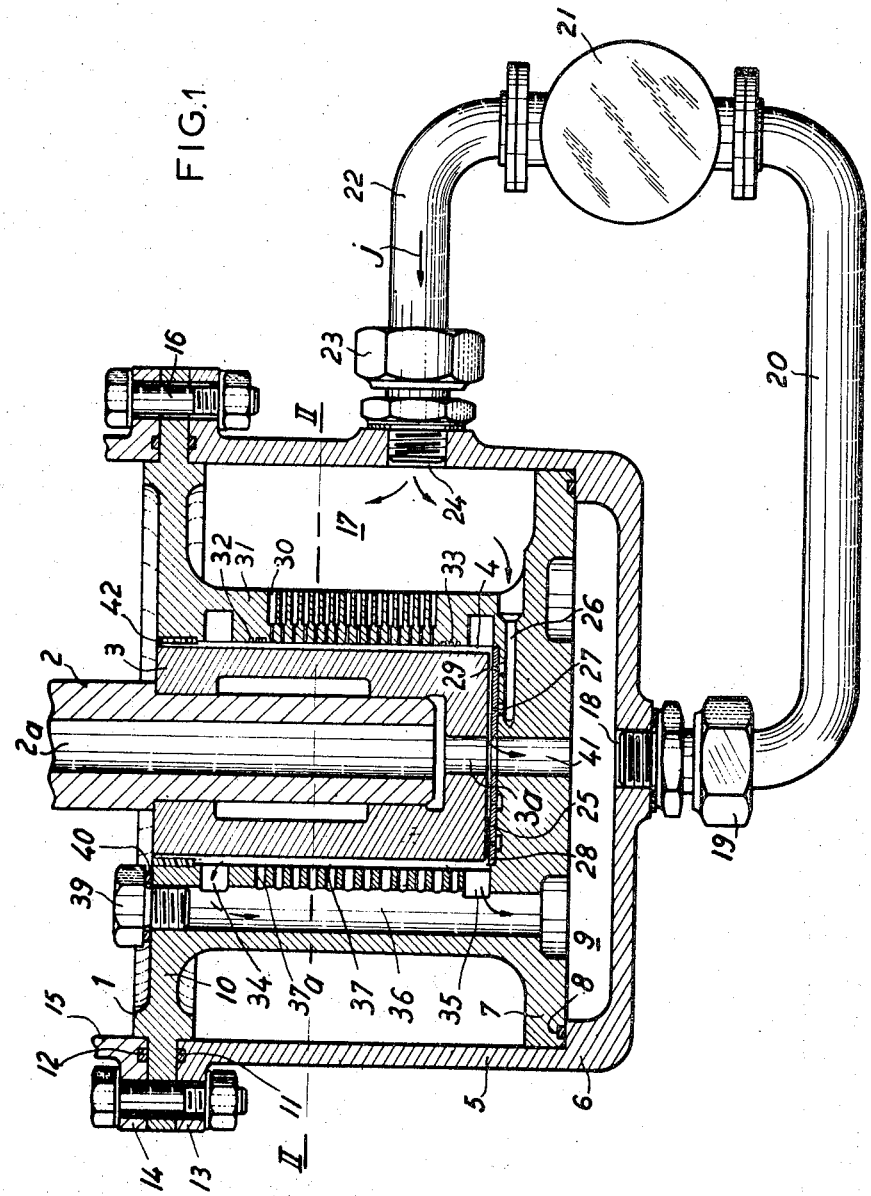
FIG. 1 is a view in cross-section on a plane in the axis of an embodiment of a bearing of the present invention.

The bearing which is illustrated in the drawings comprises a body 1 which is intended to receive a rotary shaft 2. The shaft 2 is pierced by an axial bore 2a. If the external diameter of said shaft is very different from the internal diameter of the bearing, the difference is compensated by means of a member 3 which is force-fitted on the shaft 2 in order that the space 4 between the bearing and the rotary element which is supported by this latter should not be too large, since it would thus be difficult to center said element. The member 3 is pierced by a hole 3a which is coaxial with the bore 2a.

The centering of the assembly 2, 3 within the bearing body 1 is carried out by means of cushions of fluid which is injected under pressure into the space 4 by means of injectors provided in the walls of the bearing body.

To this end, the body 1 is enclosed within a casing 5, there being formed at the bottom of said casing an annular shoulder 6 on which a flange 7 of the bearing body is supported with interposition of a sealing joint 8, thus forming at the bottom of the casing a collecting space 9.

Figure 2:
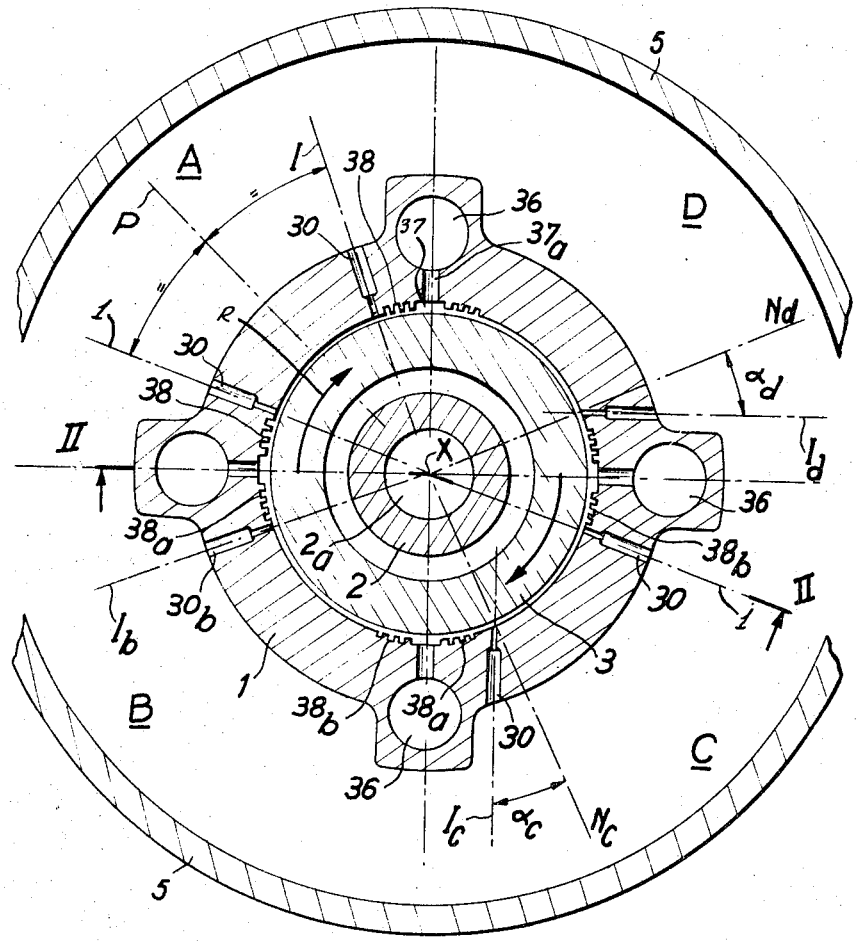
FIG. 2 is a cross-section of the bearing of FIG. 1 taken along the line II—II of FIG. 1.

The top flange 10 of the body 1 is clamped with interposition of sealing joints 11 and 12 between two flanges 13 and 14 of the casing 5 and of a housing 15 (which is partially shown); the said flanges are clamped together by means of bolts 16 (as shown in FIG. 2).

Between the flange 7, the flange 10, the bearing body and the casing, there is formed an annular space 17 into which the fluid under pressure is directed.

The base of the casing 5 is pierced by an orifice 18 in which is screwed a union nut 19 for connecting thereto a pipe 20 which leads to the suction inlet of a pump 21, the outlet pipe 22 of which is connected by means of a union nut 23 to a lateral orifice 24 of the casing 5.

The fluid is delivered into the annular space 17 and sucked into the collector 9.

The rotating member 2, 3, which is of the vertical axis type in the example described, is supported by an annular cushion 25 formed beneath the end face of said member and is maintained in position by means of lateral cushions provided within the space 4.

The formation of the annular cushion 25 is ensured by means of radial bores 26 which terminate in grooves 27 pierced in the base of the bore of the body 1. Said base is covered by a washer 28 which is pierced by small apertures forming injectors 29.

The lateral cushions are formed by means of lateral injectors 30 and 50 which are pierced in the central wall 31 of the body 1. The positional arrangement and distribution of said injectors will be studied in detail hereinafter.

Provision is made on each side of the groups of lateral injectors for labyrinth seals 32 and 33 beyond which are hollowed-out peripheral channels 34 and 35.

As shown also in FIG. 1, the channels 34 and 35 are connected by means of wells 36 which are parallel to the bearing axis and which traverse the body 1 from one end to the other. The bore of the bearing is provided opposite said wells with grooves 37 which are also parallel to the axis, there being formed at the bottom of said grooves holes 37a which open into the wells. Provision is made on each side of the grooves 37 for labyrinth seals 38 (as shown in FIGS. 1 and 4); the seals 32, 33 and 38 delimit segments in which the different lateral cushions of pressurized fluid are formed and the main function of which is to limit the leakage flow rate.

In the example which is shown in the drawings, the wells 36 are sealed off by means of plugs 39 fitted with sealing joints 40. Said wells could be left open if the fluid were to be discharged at the top and not through the orifice 18 which would in that case be sealed off. The fluid could also in this case be discharged through the bores of the shaft 2 and the member 3.

In the example considered, the fluid flows in the direction of the arrows $j$ as shown in FIG. 2 and passes out of the bearing, then flows into the collector 9, through the wells 36 and through a central bore 41 which is provided opposite the bore 3a of the member 3 in the base of the body 1.

Provision is made at the inlet of said body for centering stops 42 so that any contacts occurring either at the time of starting or at the time of stopping can take place without damage.

As has been shown in the upper left hand quadrant A of FIG. 1 and in the corresponding panel $A_1$ of FIG. 4, in the known bearings of the type hereinabove described, the injectors 30 and 50 which effect the formation of the lateral cushions are set in longitudinal and transverse rows adjacent the seals 32, 33 and 38 symmetrically with respect to the plane P which bisects the quadrant and the axes I of said injectors pass through the axis X of the bearing.

In accordance with this invention, a number of different arrangements can be adopted:

Firstly and in a general manner, the axes of the injectors 50 of the rows adjacent the seals 32 and 33 pass through the axis X of the bearing but they can either be located in planes at right angles to the axis X in a known manner or else be inclined to said axis X towards the interior of the cushion.

So far as the other injectors are concerned, a few examples of possible arrangements have been indicated.

In the quadrant B of FIG. 1 and in the corresponding panel $B_1$ of FIG. 4, a row of injectors 30b is disposed alongside the seal 38a which is located downstream with respect to the direction of rotation of the shaft as indicated by the arrow R. The axes $I_b$ of these injectors pass through the bearing axis X. There is no row of injectors along the upstream seal 38b.

In the third quadrant C of FIG. 1 and in the corresponding panel $C_1$ of FIG. 4, the downstream seal 38a is bordered by a row of injectors 30c, the axes $I_c$ of which are inclined towards the interior of the fluid cushion so as to make an angle $\alpha_c$ with the normal $N_c$. On the upstream side, the axes I of the injectors 30 pass through the bearing axis X.

In the fourth quadrant D, there is no row of injectors upstream of the seal 38b and, on the downstream side, the axis $I_d$ of the injectors 30d makes with the normal $N_d$ an angle $\alpha_d$ towards the interior of the fluid cushion.

Figure 3:
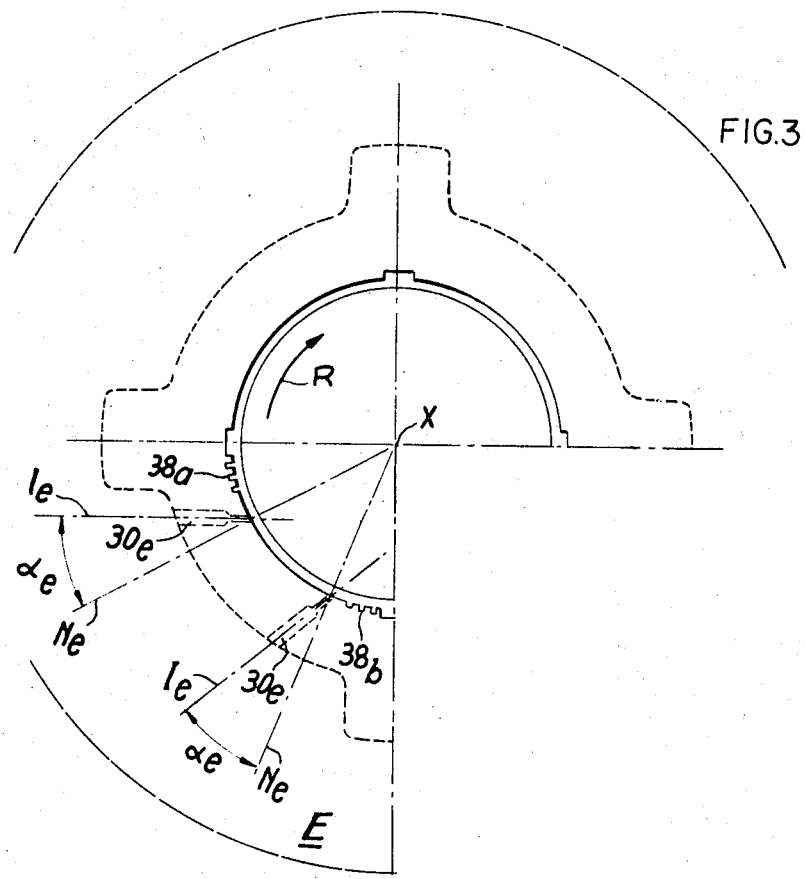
FIG. 3 is a partial diagrammatic view similar to FIG. 1 showing a further embodiment of the present invention.

In FIG. 3, in the quadrant E, the seals 38a and 38b are bordered by rows of injectors 30e, the axes $I_e$ of which make an angle $\alpha_e$ with the normal $N_e$, this angle being the same in the case of both rows of injectors; the injectors of the downstream row direct the fluid towards the interior of the fluid cushion whilst the injectors of the upstream row direct the fluid towards the exterior of the fluid cushion in the direction opposite to the direction of rotation of the shaft 2 and of the member 3.

Figure 3A:
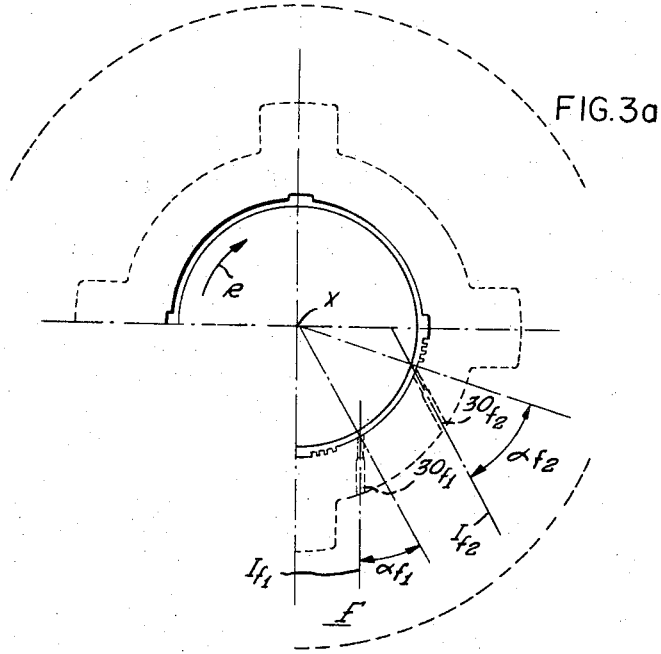
FIG. 3A is a view similar to that of FIG. 3 showing another embodiment of the present invention.

In the quadrant F of FIG. 3A, the arrangement is substantially the same but the axes $I_{f1}$ and $I_{f2}$ of the injectors $30_{f1}$ and $30_{f2}$ of the upstream and downstream rows make different angles $\alpha_{f1}$ and $\alpha_{f2}$ with the normals $N_{f1}$ and $N_{f2}$.

In all of the examples hereinabove described, the positional arrangement and/or orientation of the injectors is such that the fluid under pressure has a tendency to flow in the direction opposite to that in which it is entrained by the rotating shaft. It is thus possible to reduce the precession process to a considerable extent and even to zero and, in particular, to increase the value of the critical frequency.

It will be understood that modifications can be made in the forms of embodiment which have just been described, especially by the substitution of equivalent technical means, without thereby departing from the scope or the spirit of the present invention.

What I claim is:

1. Hydrostatic fluid bearing comprising a housing having a generally cylindrical shape in which a shaft substantially coaxial with said housing is rotatable with play, said bearing comprising fluid injectors which open into said housing so as to supply fluid cushions under pressure around said shaft, said fluid injectors being so arranged that said fluid has a tendency to circulate between said housing and said shaft in the direction opposite to the movement of the rotation of said shaft in order to reduce the entrainment of said fluid and to reduce the movement of precession of said shaft and of the effects of said movement, said fluid cushions being delimited by seals which are respectively parallel and perpendicular to the bearing axis so as to divide said housing into segments and, in each segment, said injectors being disposed asymmetrically with respect to the central diametral plane of said segment.

2. Fluid bearing in accordance with claim 2, said injectors being arranged in rows respectively parallel to and adjacent a certain number of the seals which delimit said segments.

3. Fluid bearing in accordance with claim 2, the axes of the injectors which are parallel to the seals located at right angles to the axis of said bearing intersecting said axis and being inclined thereto towards the interior of said segment.

4. Fluid bearing in accordance with claim 3, the rows of injectors which are directed parallel to the axis of said bearing being provided alongside seals located downstream with respect to the direction of rotation of the shaft.

5. Fluid-bearing in accordance with claim 4, the axes of said injectors passing through the axis of said bearing.

6. Fluid bearing in accordance with claim 4, the axes of said injectors being inclined towards the interior of said corresponding segment.

7. Fluid bearing in accordance with claim 2, the rows of injectors which are directed parallel to the bearing axis being provided alongside the upstream and downstream seals, the axes of the injectors of two consecutive rows being asymmetrical with respect to the mean diametral plane of the segment which is delimited between said two rows.

8. Fluid bearing in accordance with claim 7, the axes of said injectors of the downstream row being inclined towards the interior of the segment.

9. Fluid bearing in accordance with claim 7, the axes of said injectors of the upstream row passing through the axis of the bearing.

10. Fluid bearing in accordance with claim 7, the axes of the injectors of the upstream row being inclined towards the exterior of the segment.

11. Fluid bearing in accordance with claim 7, the axes of said injectors of the upstream and downstream rows being inclined at equal angles to the line which is normal to the internal surface of the housing.

References Cited

FOREIGN PATENTS 1,296,508    5/1962    France.

MARTIN P. SCHWADRON, *Primary Examiner.*

FRANK SUSKO, *Examiner.*